(12) United States Patent
Lee et al.

(10) Patent No.: US 12,106,189 B2
(45) Date of Patent: Oct. 1, 2024

(54) ENHANCED PRECISION MACHINE LEARNING PREDICTION

(71) Applicant: SAMSUNG ELECTRONICS CO., LTD., Gyeonggi-Do (KR)

(72) Inventors: Dongjin Lee, San Jose, CA (US); Rezwana Karim, Sunnyvale, CA (US); Rishikesh Sanjay Ghewari, Sunnyvale, CA (US); Dongyun Jin, San Jose, CA (US)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 1003 days.

(21) Appl. No.: 17/087,935

(22) Filed: Nov. 3, 2020

(65) Prior Publication Data

US 2022/0138618 A1   May 5, 2022

(51) Int. Cl.
*G06N 20/00* (2019.01)
*G06F 17/18* (2006.01)
(Continued)

(52) U.S. Cl.
CPC ............. *G06N 20/00* (2019.01); *G06F 17/18* (2013.01); *G06F 18/211* (2023.01); *G06F 18/241* (2023.01); *G06F 18/2431* (2023.01)

(58) Field of Classification Search
CPC ..... G06N 20/00; G06F 18/211; G06F 18/241; G06F 18/2431; G06F 17/18
See application file for complete search history.

(56) References Cited

U.S. PATENT DOCUMENTS 7,363,254 B2   4/2008   Skinner
8,706,548 B1   4/2014   Blume et al.
(Continued)

FOREIGN PATENT DOCUMENTS

KR   20160139247 A   12/2016
KR   20200093870 A   8/2020

OTHER PUBLICATIONS

Bhamidipati et al., A Large Sclae Prediction Engine for App Install Clicks and Conversions, CIKM '17, Nov. 2017. (Year: 2017).*

(Continued)

*Primary Examiner* — Marshall L Werner
(74) *Attorney, Agent, or Firm* — Cuenot, Forsythe & Kim, LLC

(57) ABSTRACT

Training a machine learning model includes electronically retrieving feature vectors that comprise a electronic representations of multidimensional observations, each observation uniquely associated with a predetermined observation value. A multi-class data structure comprising a plurality of buckets is generated by binning the observation values associated with the multidimensional observations. Each bucket corresponds to a range of values and contains observations whose associated observation values lie within the range. A machine learning model is trained using the feature vectors to classify feature vector inputs, assigning each feature vector input to a bucket. Simulated execution of the machine learning model classifies simulation feature vectors by assigning each simulation feature vector to a bucket based on the feature. For each bucket, a regression value is determined based on an aggregation of simulation feature vectors assigned to the bucket, thereby enabling the machine learning model to predict regression values corresponding to subsequent feature vector inputs.

20 Claims, 8 Drawing Sheets

(51) Int. Cl.
  *G06F 18/211* (2023.01)
  *G06F 18/241* (2023.01)
  *G06F 18/2431* (2023.01)

(56) References Cited

U.S. PATENT DOCUMENTS

| | | |
|---|---|---|
| 8,788,339 B2 | 7/2014 | Hughes et al. |
| 2010/0082400 A1 | 4/2010 | Bagherjeiran et al. |
| 2014/0025479 A1 | 1/2014 | Carter et al. |
| 2017/0127133 A1* | 5/2017 | Sullivan ............. H04N 21/4667 |
| 2020/0311559 A1* | 10/2020 | Chattopadhyay ........ G06N 5/01 |

OTHER PUBLICATIONS

Perlich et al., Bid Optimizing and Inventory Scoring in Target Online Advertising, KDD '12, Aug. 2012. (Year: 2012).*

* cited by examiner

300

---

Electronically retrieve multiple feature vectors, each feature vector comprising an electronic representation of a corresponding one of a plurality of multidimensional observations, each observation uniquely associated with a predetermined observation value

302

---

Generate a multi-class data structure comprising a plurality of buckets by binning the observation values associated with the multidimensional observations, each bucket corresponding to a distinct range of values and containing one or more observations whose associated observation values lie within the distinct range

304

---

Train the machine learning model, using the plurality of feature vectors, to classify feature vector inputs by assigning each feature vector input to one of the plurality of buckets based on feature values of each feature vector input

306

---

Execute the machine learning model to simulate the classifying of a set of simulation feature vectors, wherein the classifying comprises assigning each simulation feature vector to one of the plurality of buckets based on feature values of each simulation feature vector

308

---

Determine for each bucket a regression value based on an aggregation of simulation feature vectors assigned to the bucket based on the classifying, thereby enabling the machine learning model to predict regression values corresponding to subsequent feature vector inputs.

```
┌─────────────────────────────────────────────────────┐
│  Identify a range of values containing observation values │
│  associated with a number of observations, wherein the number │
│       indicates a predetermined data imbalance       │
│                                                     │
│                        402                          │
└─────────────────────────────────────────────────────┘
                          │
                          ▼
┌─────────────────────────────────────────────────────┐
│  Construct an ordered sequence of buckets, wherein for each │
│     successive pair of buckets the number of observations │
│   contained in a bucket whose corresponding range of values is │
│  numerically farther from the identified range corresponding to │
│    the data imbalance contains a number of observations less │
│   than or equal to the number of observations of a bucket whose │
│         range is numerically closer to the identified range │
│            corresponding to the data imbalance       │
│                        404                          │
└─────────────────────────────────────────────────────┘
```

Iteratively create a succession of ordered sequences of buckets, each ordered sequence based on a different value of a predetermined parameter for determining a difference between the numbers of observations in each successive pair of buckets

502

Determine the classification accuracy of the machine learning model using each of the succession of ordered sequences of buckets

504

Select, based on the classification accuracy, one of the succession of ordered sequences of buckets for generating the multi-class data structure

ENHANCED PRECISION MACHINE LEARNING PREDICTION

TECHNICAL FIELD

This disclosure relates to machine learning systems, and more particularly, to training machine learning models and generating predictions using such models.

BACKGROUND

A system based on a classical programming paradigm, such as symbolic artificial intelligence (AI), typically performs tasks according to human-devised rules. A machine learning system by contrast is trained by being presented with task-related, machine-encoded examples, based on which the system finds a statistical structure that allows the system to devise for itself a set of rules for automating a task. With continuing advances in hardware and ever-larger datasets, machine learning systems can be trained to perform an increasing number of automated tasks.

SUMMARY

In one or more embodiments, a method includes electronically retrieving a plurality of feature vectors, each feature vector comprising an electronic representation of a corresponding one of a plurality of multidimensional observations, each observation uniquely associated with a predetermined observation value. The method includes generating a multi-class data structure comprising a plurality of buckets by binning the observation values associated with the multidimensional observations, each bucket corresponding to a distinct range of values and containing one or more observations whose associated observation values lie within the distinct range. The method includes using the plurality of feature vectors to train the machine learning model to classify feature vector inputs by assigning each feature vector input to one of the plurality of buckets based on feature values of each feature vector input. The method includes executing the machine learning model to simulate the classifying of a set of simulation feature vectors, wherein the classifying comprises assigning each simulation feature vector to one of the plurality of buckets based on feature values of each simulation feature vector. The method includes determining for each bucket a regression value based on an aggregation of simulation feature vectors assigned to the bucket based on the classifying, thereby enabling the machine learning model to predict regression values corresponding to subsequent feature vector inputs.

In one or more embodiments, a system includes a processor configured to initiate operations. The operations include electronically retrieving a plurality of feature vectors, each feature vector comprising an electronic representation of a corresponding one of a plurality of multidimensional observations, each observation uniquely associated with a predetermined observation value. The operations include generating a multi-class data structure comprising a plurality of buckets by binning the observation values associated with the multidimensional observations, each bucket corresponding to a distinct range of values and containing one or more observations whose associated observation values lie within the distinct range. The operations include using the plurality of feature vectors to train the machine learning model to classify feature vector inputs by assigning each feature vector input to one of the plurality of buckets based on feature values of each feature vector input. The operations include executing the machine learning model to simulate the classifying of a set of simulation feature vectors, wherein the classifying comprises assigning each simulation feature vector to one of the plurality of buckets based on feature values of each simulation feature vector. The operations include determining for each bucket a regression value based on an aggregation of simulation feature vectors assigned to the bucket based on the classifying, thereby enabling the machine learning model to predict regression values corresponding to subsequent feature vector inputs.

In one or more embodiments, a computer program product includes one or more computer readable storage media having instructions stored thereon. The instructions are executable by a processor to initiate operations. The operations include electronically retrieving a plurality of feature vectors, each feature vector comprising an electronic representation of a corresponding one of a plurality of multidimensional observations, each observation uniquely associated with a predetermined observation value. The operations include generating a multi-class data structure comprising a plurality of buckets by binning the observation values associated with the multidimensional observations, each bucket corresponding to a distinct range of values and containing one or more observations whose associated observation values lie within the distinct range. The operations include using the plurality of feature vectors to train the machine learning model to classify feature vector inputs by assigning each feature vector input to one of the plurality of buckets based on feature values of each feature vector input. The operations include executing the machine learning model to simulate the classifying of a set of simulation feature vectors, wherein the classifying comprises assigning each simulation feature vector to one of the plurality of buckets based on feature values of each simulation feature vector. The operations include determining for each bucket a regression value based on an aggregation of simulation feature vectors assigned to the bucket based on the classifying, thereby enabling the machine learning model to predict regression values corresponding to subsequent feature vector inputs.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIG. 3 is a flowchart of an example method of training a machine learning model according to an embodiment.

FIG. 4 is a flowchart of an example method of bucketizing multiple observation values used in training a machine learning model according to an embodiment.

FIG. 5 is a flowchart of an example method for generating a multi-class data structure that, used in the training of a machine learning model, enhances the predictive accuracy of the model according to an embodiment.

DETAILED DESCRIPTION

Figure 1:
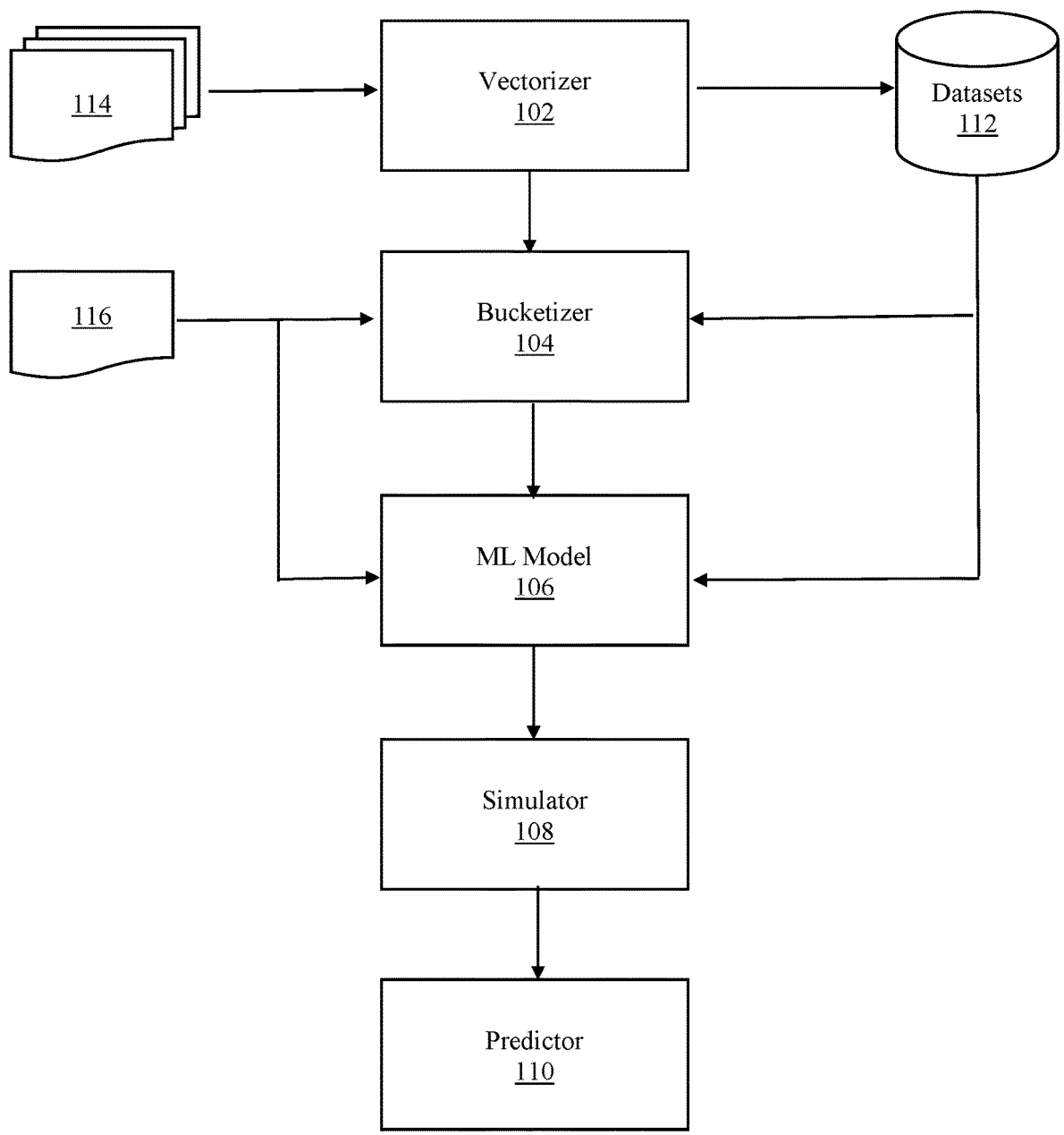
FIG. 1 depicts an example machine learning system according to an embodiment.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to machine learning systems, and more particularly, to training machine learning models and generating predictions using such models. Two of the various tasks performed by a machine learning system are classification and regression. A machine learning system performs classifications by generating, based on machine-encoded data, a function $f=\mathbb{R}^n \to \{1, \ldots, k\}$ that assigns an input represented by feature vector x to one of k classes or categories identified by a numeric code $y=f(x)$. For example, based on an appropriate set of training examples, the machine learning system can classify digital images of x-rays or digital data of a biopsy for classifying an individual's state of health.

A machine learning system performs regressions by generating a function $f: \mathbb{R}^n \to \mathbb{R}$. For example, the machine learning system can determine a regression value that indicates, based on sensor-generated data, the expected time of failure of a machine or, based on device user data, the likelihood that a user will respond to an on-line impression (ad) by making an in-app purchase.

With respect to both classifications and regressions, the predictive accuracy of a machine learning model can be significantly diminished by a data imbalance. As defined herein, a "data imbalance" is any characteristic inherent in a predetermined set of data that causes a machine learning model to be biased. A data imbalance occurs if the number of observations within one class of classification data greatly exceeds that of the other class or classes. For example, in the context of a binary classification of human genes as healthy or potentially cancerous a machine learning model trained using a set of training examples comprising 90 percent healthy genes and 10 percent oncogenes will achieve 90 percent accuracy by classifying every gene as healthy. The data imbalance is skewed toward healthy genes and the machine learning model is biased accordingly. The machine learning model is biased toward generating false positives.

Similarly, a data imbalance occurs in the context of training a machine learning model to perform a regression if the number of observations associated with one regression value (e.g., a continuous real number or integer) or a range of values far exceeds the number of observations associated with other values or other ranges. For example, optimizing return-on-ad-spending (ROAS) in the context of a real-time automated trading system requires predictions of revenues generated by device users' in-app purchases (IAPB). Typically, however, only a very small percentage of impressions generate positive IAP revenues (e.g., 0.001 percent). In training a machine learning model, the low response-to-impression rates of device users requires the use of training data that is highly imbalanced, which in turn, can significantly reduce the reliability of predictions made with the model. The data imbalance with respect to zero IAP revenues, biases the machine learning model to generate false negatives (zero response-to-impression rates) and fails to capture and incorporate the effect of positive IAP revenues.

An aspect of the systems, methods, and computer program products disclosed herein is a machine-learning architecture that eliminates or mitigates the effect of data imbalance. Another aspect is a process for training a machine learning model having an enhanced predictive capability notwithstanding being trained using a set of training examples biased by data imbalance. Still another aspect is transforming a hard to solve regression task into a multi-class classification task that is more stable and yields more reliable predictions. A predicted regression value is determined based on initially classifying an input using a machine learning model trained to classify feature vector inputs by assigning the inputs to one of multiple buckets. Each bucket uniquely corresponds to a regression value determined through a self-executing prediction adjustment procedure.

The system's self-executing prediction adjustment is performed after training the machine learning model. The system self-executes experiments with the trained machine learning model and evaluates the self-executed experimental results generated with the machine learning model. After aggregating the results, the machine learning system adjusts the model to align machine learning model-generated results with the self-executed experimental results. Based on the adjusted model, the system determines a regression value for each feature vector input.

The arrangements described herein are directed to computer technology and provide an improvement to existing computer technology. Not only do the arrangements enhance the predictions generated in the face of data imbalances, but also improve computer technology accelerating the speed with which a computer-implemented machine learning model can be trained. Whereas, conventionally, low levels of predictive accuracy of a machine learning model are dealt with manually by a user manually tuning the model's hyperparameters and/or implementing one or more alternative machine learning models. The machine learning model training implemented according to the embodiments disclosed herein automates the adjustments to the machine learning model using the self-executing prediction adjustments described above.

A further improvement to computer technology pertains to hardware usage requirements. Hardware resource efficiency is enhanced by obviating the need to use the resource through successive adjustments to tune the model's hyperparameters and/or executing one or more alternative models, which may ultimately prove unfruitful in any event given data imbalance. Thus, the systems, methods, and computer program products disclosed herein not only eliminate or mitigate the effects of data imbalance, but simultaneously enhance the efficiency of the underlying hardware.

Further aspects of the embodiments described within this disclosure are described in greater detail with reference to the figures below. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Figure 6:
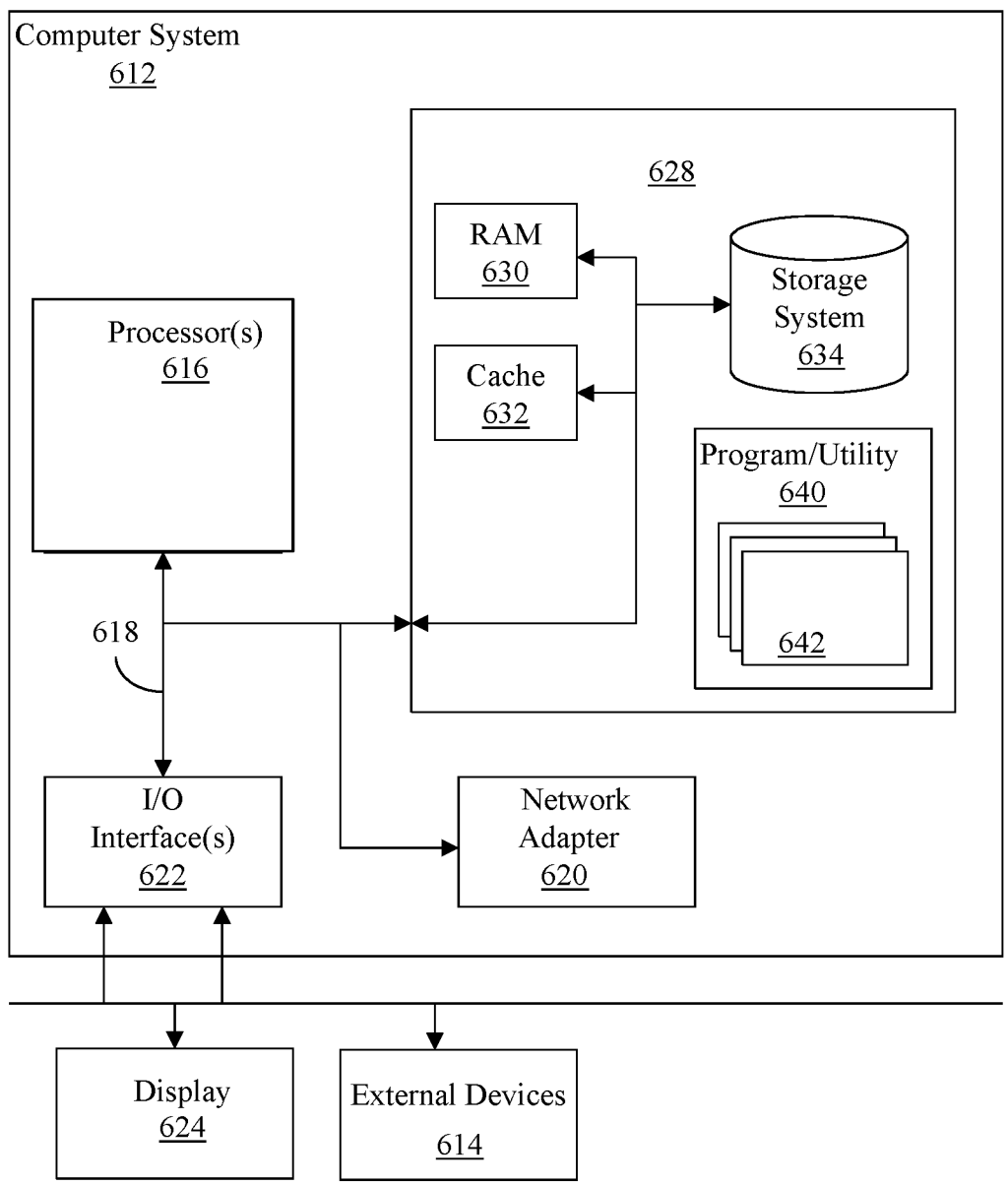
FIG. 6 depicts an example computing node for implementing a machine learning model according to an embodiment.

FIG. 1 depicts an example machine-learning (ML) system 100 according to one embodiment. ML system 100 illustratively includes vectorizer 102, bucketizer 104, machine learning (ML) model 106, simulator 108, and predictor 110. Vectorizer 102, bucketizer 104, ML model 106, simulator 108, and predictor 110, in certain embodiments, are implemented in machine-executable software. Embodied in machine-executable software, each component of ML system 100 can be stored in memory and can execute on one or more processors of a computer system such as computer system 612 (FIG. 6). The components of the computer system can include hardware components such as one or more processors 616, memory 628, and bus 618 that operatively couples various components, including memory 628 to processor(s) 616, of computer system 612 (FIG. 6). In other embodiments, ML system 100 can be implemented in hardwired circuitry or a combination of hardwired circuitry and software.

ML model 106 is trained using a set of training examples electronically retrieved from among one or more datasets 112 that are electronically stored in a memory of the computer system. The training examples comprise feature vectors generated by vectorizer 102 based on a collection of multidimensional observations 114. Each feature vector is an electronic representation of a corresponding one of multidimensional observations 114. Each of multidimensional observations 114 is uniquely associated with a predetermined observation value (e.g., continuous real number or discrete integer). An observation value, as described below, can provide a basis for classifying an associated observation based on the values of the features of the feature vector corresponding to the associated observation. Multidimensional observations 114 thus provide the basis for the generation of feature vectors by vectorizer 102 and, in some embodiments, can be conveyed to the computer system over a data communications network, such as the Internet, a wide area network (WAN), local area network (LAN), or other such network via wired and/or wireless connection.

Bucketizer 104 generates a multi-class data structure by binning the observation values associated with a set of multidimensional observations, whose corresponding feature vectors are labeled (using the observation values) and used as labeled examples for training ML model 106. The multi-class data structure generated by binning the observation values comprises a plurality of buckets. Each bucket corresponds to a distinct range of values and contains one or more multidimensional observations whose associated observation values lie within the distinct range. Accordingly, the buckets generated by bucketizer 104 each correspond to a class or category into which multidimensional observations are placed and, equivalently, to which the feature vectors corresponding to the multidimensional observations are assigned by ML model 106.

ML model 106 is trained using the set of feature vectors generated by vectorizer 102. The buckets generated by bucketizer 104 correspond to labels for labeling training examples (feature vectors) to train ML model 106, the examples as described above being the multidimensional observations whose electronic representations are the feature vectors. Accordingly, each training example corresponds to an n+1 vector, $<x_i, y_i>$, where $x_i$ is the n-element feature vector corresponding to the i-th multidimensional observation and $y_i$ is the label indicating the bucket in which the training example is placed given the observation value associated with the multidimensional observation represented by $x_i$. Using the labeled training examples, ML model 106 can be trained as a classification model using supervised learning. ML model 106, in some embodiments, can be trained as a deep neural network (a neural network with more than one hidden layer between the input and output layers). In other embodiments, ML model 106 can be trained as a logistic regression model, a type of classification model trained using supervised learning. In still other embodiments, various other machine learning algorithms can be used to train ML model 106, such as gradient boosting trees, random forests, ordinal regressions, and the like.

Figure 2A:
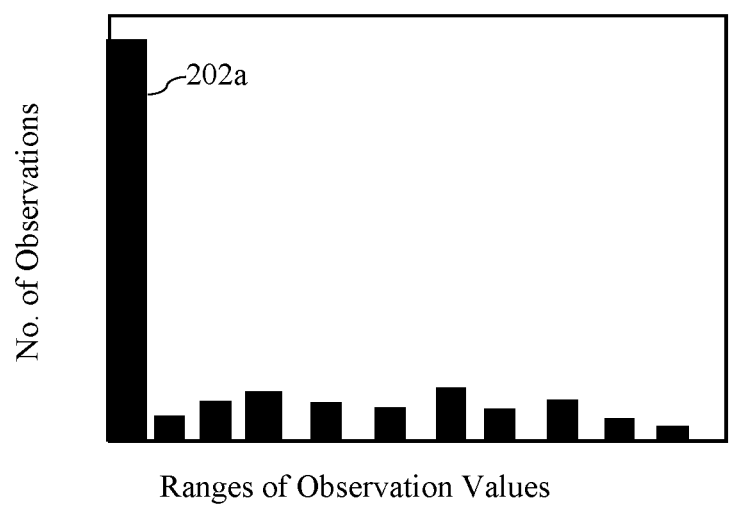
FIGS. 2A-2C depict example ranges of values of a feature of feature vectors used for training a machine learning model according to an embodiment.
Figure 2B:
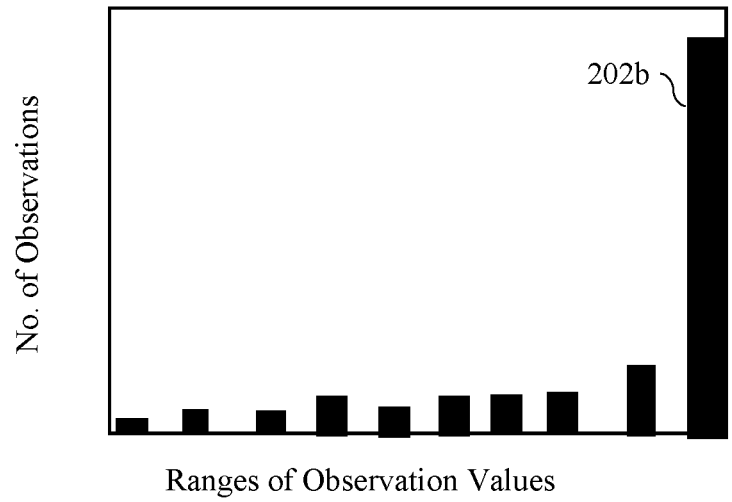
Figure 2C:
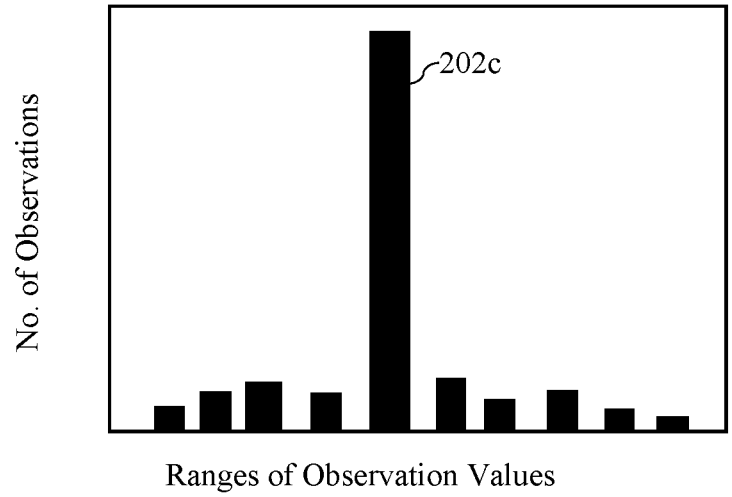

A set of feature vectors can correspond to a specific collection of observations whose associated observation values exhibit data imbalance. Referring additionally to FIGS. 2A-2C, different ranges of observation values exhibiting data imbalance are illustrated. FIG. 2A depicts an example collection of observation values (e.g., continuous real numbers or discrete integers) 200a wherein the observation values lie within a plurality of discrete ranges. The leftmost point of the graph on the horizontal axis is the origin and observation values increase the farther to the right of the origin one moves. The vertical axis measures the number of observations for which the corresponding observation values lie within a range measured on the horizontal axis. The leftmost range of observation values 202a exhibits an imbalance relative to each of the other ranges of values. FIG. 2B depicts an example collection of observation values 200b wherein the data imbalance is exhibited by the rightmost range of values 202b. FIG. 2C depicts an example collection of observation values 200c wherein the data imbalance occurs in a range of values greater than the range of values to the left and less than the ranges of values to the right of range of values 202c.

Confronted with a data imbalance, a typical machine learning model may not provide accurate predictions due to low precision. Tuning the hyperparameters of the ML model or altering the model architecture, as done conventionally, may not improve the machine learning model's accuracy given the data imbalance. ML system 100 does mitigate the imbalance effect and enhance the predictive accuracy of ML model 106.

More specifically, once ML model 106 is trained, simulator 108 performs a prediction adjustment procedure that mitigates or eliminates the effects of data imbalance. Simulator 108 simulates the classifications performed by ML model 106 executing on one or more processors. Simulator 108 can simulate ML model 106 classifications by causing ML model 106 to classify each of a selected set of simulation feature vectors. The selected set of simulation feature vectors can comprise a testing set of examples—that is, a set of labeled feature vectors corresponding to a corresponding set of observations selected for testing and having associated observation values that are used for labeling the simulation feature vectors. ML model 106, in simulation, classifies the set of simulation feature vectors by assigning each simulation feature vector to one of the buckets generated by bucketizer 104.

Predictor 110 determines for each of the plurality of buckets a regression value (e.g., continuous real number, discrete integer). In certain embodiments, a regression value is based on an aggregation of simulation feature vectors assigned to a bucket based on the simulated classifying by ML model 106. For example, the regression value can comprise an expected value based on a summation of the observation values (labels) of each observation contained in each bucket:

$$\sum_{i=1}^{N} \frac{y_i}{N},$$

where $y_i$ is the label (observation value) of the i-th feature vector corresponding to the i-th observation contained in the bucket, which is assumed to contain a total of N observations.

Accordingly, ML system 100 can transform a regression task into a multi-class classification task. For feature vector input 116, ML system 100 can classify the input using ML model 106 and, based on the classifying, assign to the input the predicted regression value generated by predictor 110 for the bucket corresponding to the classification.

In some embodiments, the buckets generated by bucketizer 104 are generated based on the observation values associated with the multidimensional observations. In other embodiments, the buckets generated by bucketizer 104 are generated based on sample size (number of observations per bucket).

Predictive performance in certain contexts is improved by adjusting the respective ranges of a succession of buckets. Accordingly, in certain embodiments bucketizer 104 adjusts the ranges of a succession of buckets based on a tunable parameter. In some embodiments, the tunable parameter is the size of each bucket, the size of a bucket measured according to the number of observations contained in the bucket. Bucketizer 104 initially identifies a plurality of observations whose associated observation values lie within an identified range of values. If the number of observations is greater than the number of remaining observations by a predetermined amount likely to bias a machine learning model, then the number indicates a predetermined data imbalance. Bucketizer 104 identifies the bucket containing the number of observations indicating a predetermined data imbalance and the corresponding range of values.

Bucketizer 104 constructs an ordered sequence of a remaining plurality of buckets, each containing observations whose associated observations do lie within the identified range of values corresponding to the data imbalance. In certain embodiments, bucketizer 104 constructs the ordered sequence by conditionally decrementing each bucket other than the bucket identified with the data imbalance. The buckets are ordered such that for each successive pair of buckets the number of observations contained in a bucket whose corresponding range of values is numerically farther from the range corresponding to the identified bucket contains a number of observations less than or equal to the number of observations of the bucket whose range is numerically closer to the range corresponding to the identified bucket. A value (or range of values) is numerically farther from another the greater the distance on a number line between the values (or ranges). The tunable parameter can be a variable percentage, x % (between zero and 100 percent). Each bucket farther from the identified bucket corresponding to the data imbalance can be x % of the immediately prior bucket closer to the identified bucket.

In certain embodiments, bucketizer 104 determines an optimal x % by iteratively varying the percentage. ML model 106 can be trained to classify feature vectors and place the corresponding observations into the resulting buckets generated using a succession of values for x % (e.g., 50%, 60%, . . . , 90%). For each set of buckets generated based on varying x %, ML model 106 classifies a test set of feature vectors. Bucketizer 104 can select the x % (e.g., 80%) that yields the best performance by ML model 106 in classifying the test set. In certain embodiments, bucketizer 104 can perform the process in two phases, comprising a coarse search and fine-grained search. A first bucket size can be determined by varying the tunable parameter x % in coarser amounts (e.g., 50%, 60%, . . . , 90%). Once an x % yielding the best performance is determined (e.g., 80%), a fine-grained search (e.g., 76%, 77%, . . . , 85%) can be performed in the neighborhood of the x % determined by the coarse search.

In still other embodiments, the tunable parameter can be the number of buckets generated by bucketizer 104, wherein the optimal number of buckets is the one for which ML model 106 yields the most accurate results. To avoid overfitting in training ML model 106, a predetermined number of samples (e.g., 15) per bucket can be determined.

The type and form of the observations can vary depending on the nature of the prediction that predictor 110 generates. For example, in one embodiment, the observations are clinical measurements for training ML model 106 to predict the log of a male individual's prostate specific antigen (PSA) for making an oncology diagnosis. The feature vectors corresponding to clinical multidimensional observations for training the model can include features such as log cancer volume, log prostate weight, age, log of benign prostatic hyperplasia amount, seminal vesicle invasion, log of capsular penetration, Gleason score, and percent of Gleason scores of a predetermined value.

In another embodiment, for example, the observations can include sensor data generated in real time by physical sensors operatively coupled to a machine. The sensor data can be digitized and used to train ML model 106 to predict when maintenance should be performed on the machine. The feature vectors corresponding to the observations for training ML model 106 can include features such as temperature of machine during hours of running, various stress levels on the machine, and other physical sensor data, as well as data such as age of the machine and hours since last maintenance.

In a particular embodiment, ML model 106 is trained to predict a computer device user's response (e.g., click, install, IAP) to an impression that is presented to the user (e.g., via user device display screen). ML system 100 can be integrated in or operatively coupled with a demand-side electronic trading platform that receives bid requests via an automated exchange and, in real time, submits bids for placement of on-line impressions. ML system 100 provides enhanced prediction of computer device users' responses to impressions, enabling the demand-side electronic trading platform to generate bids having a greater likelihood of enhancing an ROAS.

Predicting in-app purchase revenues (IAPRs) generated by user responses to impressions is difficult due to data imbalance. The distribution of the data tends to be highly skewed toward the low end (e.g., zero to 1 or less). Although few samples lie in higher regions of the data distribution, these samples are nonetheless necessary for generating reliable predictions because higher-valued IAPRs influence overall ROAS.

Data imbalance results from the extremely low number of samples in which the IAPR is positive. The data imbalance biases a conventional ML model into generating false negatives (zero IAPRs). A conventional ML model fails to adequately factor in the effect of positive IAPRs in training the ML model. Because of the extreme data imbalance, a typical machine learning model may not provide accurate predictions due to low precision and accuracy may not be improved by hyperparameter tuning or altering the model architecture. ML system 100 mitigates the bias thereby eliminating or reducing the false negatives. The ML system 100 converts a hard-to-solve classification task into a regression task and enhances the predictive accuracy of ML model 106.

ML system 100 loads and executes ML model 106 on a set of training data. For each classification based on ML model 106, predictor 108 aggregates IAPR into the class corresponding to a specific bucket and determines based on the aggregation an expected IAPR value, or regression value, for each bucket. The regression value yields a predicted IAPR for each class. This adjusted expected value of IAPR-per-impression, based on the simulation, provides a more accurate prediction than, for example, the median or average of the original ranges of values of each bucket. The more accurate prediction in some cases may reduce the bid price of most bid requests if the majority of application installs fails to generate IAPB. However, more accurate predictions make bid prices more competitive (higher) for those specific bid requests with which the probability of positive IAPB is greater. On net, with more accurate predictions, spending may be the same or reduced but the overall IAP amount will be approximately the same or greater, thereby increasing the ROAS.

Based on empirical testing, the adjusted prediction value has proven more reliable and has achieved good performance in terms of ROAS, a key performance indicator, by reducing ad spending significantly while maintaining the same or achieving a greater amount of IAPR.

In one embodiment, ML system 100 can further enhance IAPR prediction by initially separating predictions into an impression-to-install (Im-To-In) prediction and install-to-revenue (In-To-Rev) prediction to generate conditional probabilities that leverage greater information. For example, a set of training data may comprise 10,000,000 impressions, 3,000 of which resulted in installs and 100 of which resulted in IAPB. By separating Im-To-In prediction from In-To-Rev prediction, an Im-To-Rev ratio 100/3,000=3.33% is generated and can be used for labeling samples that yield non-zero values, rather than merely 100/10,000,000=0.001%. In generating a bid request, these two models can be executed in parallel and an impression-to-revenue (Im-To-Rev) determined as the product of the Im-To-In prediction and the In-To-Rev prediction.

FIG. 3 is a flowchart of example method 300 of training a machine learning model according to an embodiment. Method 300 can be performed by the same or similar systems as described with reference to FIGS. 1 and 2A-2C. The system at block 302 electronically retrieves multiple feature vectors. Each feature vector is an electronic representation of a corresponding one of a plurality of multidimensional observations. Each multidimensional observation is uniquely associated with a predetermined observation value.

At block 304, the system generates a multi-class data structure comprising a plurality of buckets. The multi-class data structure is generated by binning the observation values associated with the multidimensional observations. Each bucket corresponds to a distinct range of values and contains one or more observations whose associated observation values lie within the distinct range. Using the plurality of feature vectors, the system at block 306 trains the machine learning model to classify feature vector inputs by assigning each feature vector input to one of the plurality of buckets based on feature values of each feature vector input.

At block 308, the system executes the machine learning model to simulate the classifying of a set of simulation feature vectors. The classifying comprises assigning each simulation feature vector to one of the plurality of buckets based on feature values of each simulation feature vector. The system at block 310 determines for each bucket a regression value based on an aggregation of simulation feature vectors assigned to the bucket based on the classifying. The system thereby enables the machine learning model to predict regression values corresponding to subsequent feature vector inputs.

In a particular embodiment, the plurality of multidimensional observations comprises user characteristics, and the machine learning model is trained to predict, based on the user characteristics, user responses to impressions displayed on a user device communicatively coupled to a communications network. Optionally, the predictions can be generated by initially separating Im-To-In data and In-To-Rev data that are part of the multidimensional observations and training the machine learning model to separately generate an Im-To-In prediction and an In-To-Rev prediction based on a plurality of feature vector inputs. Processing efficiency can be significantly enhanced by the system simultaneously learning to generate the Im-To-In prediction and In-To-Rev prediction. An Im-To-Rev prediction can be determined from the product of the Im-To-In and In-To-Rev predictions. The system can respond to bid requests conveyed via an electronic exchange network by automatically generating responses based on predicted user responses to impressions. The responses can be generated in real time.

FIG. 4 is a flowchart of example method 400 of generating a multi-class data structure used in the training of a machine learning model according to an embodiment. Method 400 can be performed by the same or similar systems as described with reference to FIGS. 1 and 2A-2C. The system at block 402 identifies a range of values containing observation values associated with a number of observations, the number indicating a predetermined data imbalance. At block 404, the system constructs an ordered sequence of buckets. With respect to each successive pair of buckets, the number of observations contained in a bucket whose corresponding range of values is numerically farther from the identified range corresponding to the data imbalance contains a number of observations less than or equal to the number of observations of a bucket whose range is numerically closer to the identified range corresponding to the data imbalance.

FIG. 5 is a flowchart of example method 500 for generating a multi-class data structure that, used in the training of a machine learning model, enhances the predictive accuracy of the model according to an embodiment. Method 500 can be performed by the same or similar systems as described with reference to FIGS. 1 and 2A-2C. The system at block 502 iteratively creates a succession of ordered sequences of buckets, each ordered sequence based on a different value of a predetermined parameter for determining a difference between the numbers of observations in each successive pair of buckets. At block 504, the system determines the classification accuracy of the machine learning model using each of the succession of ordered sequences of buckets. At block 506, the system selects from among the succession of ordered sequences one ordered sequence of buckets for generating the multi-class data structure, the selection based on the determined classification accuracy.

FIG. 6 illustrates a schematic of an example of a computing node 600 which can be used to implement a machine learning system. Computing node 600, in some embodiments, can be a network node communicatively coupled through a wired or wireless connection with one or more other computing nodes via a communications network. In other embodiments, computing node can comprise an isolated, stand-alone computing device or system. Computing node 600 is not intended to suggest any limitation as to the scope of use or functionality of embodiments of the invention described herein. Computing node 600 is capable of performing any of the functionality described within this disclosure.

Computing node 600 illustratively includes a computer system 612, which is operational with numerous other general-purpose or special-purpose computing system environments or configurations. Examples of well-known computing systems, environments, and/or configurations that may be suitable for use with computer system 612 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 612 may be described in the general context of computer system-executable instructions, such as program modules, being executed by a computer system. Generally, program modules may include routines, programs, objects, components, logic, data structures, and so on that perform particular tasks or implement particular abstract data types. Computer system 612 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system 612 is shown in the form of a general-purpose computing device. The components of computer system 612 may include, but are not limited to, one or more processors 616, a memory 628, and a bus 618 that couples various system components including memory 628 to processor 616. As defined herein, "processor" means at least one hardware circuit configured to carry out instructions. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

The carrying out of instructions of a computer program by a processor comprises executing or running the program. As defined herein, "run" and "execute" comprise a series of actions or events performed by the processor in accordance with one or more machine-readable instructions. "Running" and "executing," as defined herein refer to the active performing of actions or events by the processor. The terms run, running, execute, and executing are used synonymously herein.

Bus 618 represents one or more of any of several types of bus structures, including a memory bus or memory controller, a peripheral bus, an accelerated graphics port, and a processor or local bus using any of a variety of bus architectures. By way of example only, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, and PCI Express (PCIe) bus.

Computer system 612 typically includes a variety of computer system-readable media. Such media may be any available media that is accessible by computer system 612, and may include both volatile and non-volatile media, removable and non-removable media.

Memory 628 may include computer system readable media in the form of volatile memory, such as random-access memory (RAM) 630 and/or cache memory 632. Computer system 612 may further include other removable/non-removable, volatile/non-volatile computer system storage media. By way of example, storage system 634 can be provided for reading from and writing to a non-removable, non-volatile magnetic media and/or solid-state drive(s) (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the invention.

Program/utility 640, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein. For example, one or more of the program modules may include IVA 696 or portions thereof.

Program/utility 640 is executable by processor 616. Program/utility 640 and any data items used, generated, and/or operated upon by computer system 612 are functional data structures that impart functionality when employed by computer system 612. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Computer system 612 may also communicate with one or more external devices 614 such as a keyboard, a pointing device, a display 624, etc.; one or more devices that enable a user to interact with computer system 612; and/or any devices (e.g., network card, modem, etc.) that enable computer system 612 to communicate with one or more other computing devices. Such communication can occur via input/output (I/O) interfaces 622. Still, computer system 612 can communicate with one or more networks such as a local area network (LAN), a general wide area network (WAN), and/or a public network (e.g., the Internet) via network adapter 620. As depicted, network adapter 620 communicates with the other components of computer system 612 via bus 618. It should be understood that although not shown, other hardware and/or software components could be used in conjunction with computer system 612. Examples, include, but are not limited to: microcode, device drivers, redundant processing units, external disk drive arrays, RAID systems, tape drives, and data archival storage systems, etc.

While computing node 600 is used to illustrate an example of a cloud computing node, it should be appreciated that a computer system using an architecture the same as or similar to that described in connection with FIG. 6 may be used in a non-cloud computing implementation to perform the various operations described herein. In this regard, the example embodiments described herein are not intended to be limited to a cloud computing environment. Computing node 600 is an example of a data processing system. As defined herein, "data processing system" means one or more hardware systems configured to process data, each hardware system including at least one processor programmed to initiate operations and memory.

Computing node 600 is an example of computer hardware. Computing node 600 may include fewer components than shown or additional components not illustrated in FIG. 6 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

Computing node 600 is also an example of a server. As defined herein, "server" means a data processing system configured to share services with one or more other data processing systems. As defined herein, "client device" means a data processing system that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. In one or more embodiments, the various user devices described herein may be client devices. Network infrastructure, such as routers, firewalls, switches, access points and the like, are not client devices as the term "client device" is defined herein.

The terminology used herein is for the purpose of describing particular embodiments only and is not intended to be limiting. Notwithstanding, several definitions that apply throughout this document now will be presented.

As defined herein, the singular forms "a," "an," and "the" include the plural forms as well, unless the context clearly indicates otherwise.

As defined herein, "another" means at least a second or more.

As defined herein, "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, "automatically" means without user intervention.

As defined herein, "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, "if" means "in response to" or "responsive to," depending upon the context. Thus, the phrase "if it is determined" may be construed to mean "in response to determining" or "responsive to determining" depending on the context. Likewise the phrase "if [a stated condition or event] is detected" may be construed to mean "upon detecting [the stated condition or event]" or "in response to detecting [the stated condition or event]" or "responsive to detecting [the stated condition or event]" depending on the context.

As defined herein, "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, the phrases "in response to" and "responsive to" mean responding or reacting readily to an action or event. Thus, if a second action is performed "in response to" or "responsive to" a first action, there is a causal relationship between an occurrence of the first action and an occurrence of the second action. The phrases "in response to" and "responsive to" indicate the causal relationship.

As defined herein, "real time" means a level of processing responsiveness that a user or system senses as sufficiently immediate for a particular process or determination to be made, or that enables the processor to keep up with some external process.

As defined herein, "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

As defined herein, "user" refers to a human being.

The terms first, second, etc. may be used herein to describe various elements. These elements should not be limited by these terms, as these terms are only used to distinguish one element from another unless stated otherwise or the context clearly indicates otherwise.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method of training a machine learning model, the computer-implemented method comprising:

electronically retrieving a plurality of feature vectors from a data set having a predetermined data imbalance, each feature vector comprising an electronic representation of a corresponding one of a plurality of multidimensional observations, each multidimensional observation uniquely associated with an observation value;

generating a multi-class data structure comprising a plurality of buckets by binning the observation values associated with the multidimensional observations, each bucket corresponding to a distinct range of the observation values and containing one or more of the plurality of multidimensional observations whose associated observation values lie within the distinct range;

using the plurality of feature vectors, training the machine learning model to classify feature vector inputs by assigning each feature vector input to one of the plurality of buckets based on feature values of each feature vector input, wherein the machine learning model is a deep neural network having one or more hidden layers and is executable by computer hardware;

mitigating a bias of the machine learning model as trained by performing a prediction adjustment on the machine learning model, wherein the bias arises from the predetermined data imbalance and the prediction adjustment includes:

executing the machine learning model as trained on a set of simulation feature vectors, wherein the machine learning model classifies the set of simulation feature vectors by, assigning each simulation feature vector to one of the plurality of buckets based on feature values of each simulation feature vector; and determining for each bucket a regression value based on an aggregation of the simulation feature vectors assigned to the bucket by the classifying performed by the machine learning model;

wherein the machine learning model is configured to predict, in real time, regression values by classifying a subsequent feature vector input into a selected bucket and output the regression value of the selected bucket.

2. The computer-implemented method of claim 1, wherein the binning to generate the multi-class data structure comprises:

identifying a selected range of values containing observation values associated with a number of observations, wherein the number of observations indicates the predetermined data imbalance; and constructing an ordered sequence of the plurality of buckets, wherein for each successive pair of the plurality of buckets the number of observations contained in a bucket whose corresponding range of values is numerically farther from the selected range corresponding to the predetermined data imbalance contains a number of observations less than or equal to the number of observations of a bucket whose range is numerically closer to the selected range corresponding to the predetermined data imbalance.

3. The computer-implemented method of claim 2, further comprising:

iteratively creating ordered sequences of the plurality of buckets, each ordered sequence based on a different value of a predetermined parameter for determining a difference between the numbers of observations in each successive pair of buckets from the plurality of buckets;

determining a classification accuracy of the machine learning model using each ordered sequence of the plurality of buckets; and selecting, based on the classification accuracy, a selected ordered sequence of the plurality of buckets for generating the multi-class data structure.

4. The computer-implemented method of claim 1, wherein the plurality of multidimensional observations comprises user characteristics, and wherein the machine learning model is trained to predict, based on the user characteristics, user responses to impressions displayed on a user device communicatively coupled to a communications network.

5. The method of claim 4, further comprising:

separating impression-to-install data and install-to-revenue data that are part of the multidimensional observations; and training the machine learning model to generate an impression-to-install prediction and training the machine learning model to generate an install-to-revenue prediction based on a plurality of feature vector inputs, wherein a product of the impression-to-install and install-to-revenue predictions provides an impression-to-revenue prediction.

6. The method of claim 4, further comprising responding to bid requests conveyed via an electronic exchange network, the responding based on the predicted user responses.

7. The method of claim 6, wherein the responding is performed in real time.

8. A system, comprising:

a processor configured to initiate operations including:

electronically retrieving a plurality of feature vectors from a data set having a predetermined data imbalance, each feature vector comprising an electronic representation of a corresponding one of a plurality of multidimensional observations, each multidimensional observation uniquely associated with an observation value;

generating a multi-class data structure comprising a plurality of buckets by binning the observation values associated with the multidimensional observations, each bucket corresponding to a distinct range of the observation values and containing one or more of the plurality of multidimensional observations whose associated observation values lie within the distinct range;

using the plurality of feature vectors, training a machine learning model to classify feature vector inputs by assigning each feature vector input to one of the plurality of buckets based on feature values of each feature vector input, wherein the machine learning model is a deep neural network having one or more hidden layers and is executable by computer hardware;

mitigating a bias of the machine learning model as trained by performing a prediction adjustment on the machine learning model, wherein the bias arises from the predetermined data imbalance and the prediction adjustment includes:

executing the machine learning model as trained on a set of simulation feature vectors, wherein the machine learning model classifies the set of simulation feature vectors by assigning each simulation feature vector to one of the plurality of buckets based on feature values of each simulation feature vector; and determining for each bucket a regression value based on an aggregation of simulation feature vectors assigned to the bucket by the classifying performed by the machine learning model;

wherein the machine learning model is configured to predict, in real time, regression values by classifying a subsequent feature vector input into a selected bucket and output the regression value of the selected bucket.

9. The system of claim 8, wherein the binning to generate the multi-class data structure comprises:

identifying a selected range of values containing observation values associated with a number of observations, wherein the number of observations indicates the predetermined data imbalance; and constructing an ordered sequence of the plurality of buckets, wherein for each successive pair of the plurality of buckets the number of observations contained in a bucket whose corresponding range of values is numerically farther from the selected range corresponding to the predetermined data imbalance contains a number of observations less than or equal to the number of observations of a bucket whose range is numerically closer to the selected range corresponding to the predetermined data imbalance.

10. The system of claim 9, wherein the processor is configured to initiate operations further comprising:

iteratively creating ordered sequences of the plurality of buckets, each ordered sequence based on a different value of a predetermined parameter for determining a difference between the numbers of observations in each successive pair of buckets from the plurality of buckets;

determining a classification accuracy of the machine learning model using each ordered sequence of the plurality of buckets; and selecting, based on the classification accuracy, a selected ordered sequence of the plurality of buckets for generating the multi-class data structure.

11. The system of claim 8, wherein the plurality of multidimensional observations comprises user characteristics, and wherein the machine learning model is trained to predict, based on the user characteristics, user responses to impressions displayed on a user device communicatively coupled to a communications network.

12. The system of claim 11, wherein the processor is configured to initiate operations further comprising:

separating impression-to-install data and install-to-revenue data that are part of the multidimensional observations; and training the machine learning model to generate an impression-to-install prediction and training the machine learning model to generate an install-to-revenue prediction based on a plurality of feature vector inputs, wherein a product of the impression-to-install and install-to-revenue predictions provides an impression-to-revenue prediction.

13. The system of claim 11, wherein the processor is configured to initiate operations further comprising responding to bid requests conveyed via an electronic exchange network, the responding based on the predicted user responses.

14. A computer program product comprising one or more computer readable storage media having program instructions collectively stored therein, the program instructions executable by a processor to cause the processor to initiate operations comprising:

electronically retrieving a plurality of feature vectors from a data set having a predetermined data imbalance, each feature vector comprising an electronic representation of a corresponding one of a plurality of multidimensional observations, each multidimensional observation uniquely associated with an observation value;

generating a multi-class data structure comprising a plurality of buckets by binning the observation values associated with the multidimensional observations, each bucket corresponding to a distinct range of the observation values and containing one or more of the plurality of multidimensional observations whose associated observation values lie within the distinct range;

using the plurality of feature vectors, training a machine learning model to classify feature vector inputs by assigning each feature vector input to one of the plurality of buckets based on feature values of each feature vector input, wherein the machine learning model is a deep neural network having one or more hidden layers and is executable by computer hardware;

mitigating a bias of the machine learning model as trained by performing a prediction adjustment on the machine learning model, wherein the bias arises from the predetermined data imbalance and the prediction adjustment includes:

executing the machine learning model as trained on a set of simulation feature vectors, wherein the machine learning model classifies the set of simulation feature vectors by assigning each simulation feature vector to one of the plurality of buckets based on feature values of each simulation feature vector; and determining for each bucket a regression value based on an aggregation of simulation feature vectors assigned to the bucket by the classifying performed by the machine learning model;

wherein the machine learning model is configured to predict, in real time, regression values by classifying a subsequent feature vector input into a selected bucket of the plurality of buckets and output the regression value of the selected bucket.

15. The computer program product of claim 14, wherein the binning to generate the multi-class data structure comprises:

identifying a selected range of values containing observation values associated with a number of observations, wherein the number of observations indicates the predetermined data imbalance; and constructing an ordered sequence of the plurality of buckets, wherein for each successive pair of the plurality of buckets the number of observations contained in a bucket whose corresponding range of values is numerically farther from the selected range corresponding to the predetermined data imbalance contains a number of observations less than or equal to the number of observations of a bucket whose range is numerically closer to the selected range corresponding to the predetermined data imbalance.

16. The computer program product of claim 15, wherein the program instructions are executable by the processor to cause the processor to initiate operations further comprising:

iteratively creating ordered sequences of the plurality of buckets, each ordered sequence based on a different value of a predetermined parameter for determining a difference between the numbers of observations in each successive pair of buckets from the plurality of buckets;

determining a classification accuracy of the machine learning model using each ordered sequence of the plurality of buckets; and selecting, based on the classification accuracy, a selected ordered sequence of the plurality of buckets for generating the multi-class data structure.

17. The computer program product of claim 14, wherein the plurality of multidimensional observations comprises user characteristics, and wherein the machine learning model is trained to predict, based on the user characteristics, user responses to impressions displayed on a user device communicatively coupled to a communications network.

18. The computer program product of claim 17, wherein the program instructions are executable by the processor to cause the processor to initiate operations further comprising:

separating impression-to-install data and install-to-revenue data that are part of the multidimensional observations; and training the machine learning model to generate an impression-to-install prediction and training the machine learning model to generate an install-to-revenue prediction based on a plurality of feature vector inputs, wherein a product of the impression-to-install and install-to-revenue predictions provides an impression-to-revenue prediction.

19. The computer program product of claim 17, wherein the program instructions are executable by the processor to cause the processor to initiate operations further comprising responding to bid requests conveyed via an electronic exchange network, the responding based on the predicted user responses.

20. The computer program product of claim 19, wherein the responding is performed in real time.

\* \* \* \* \*